Patented Feb. 6, 1951

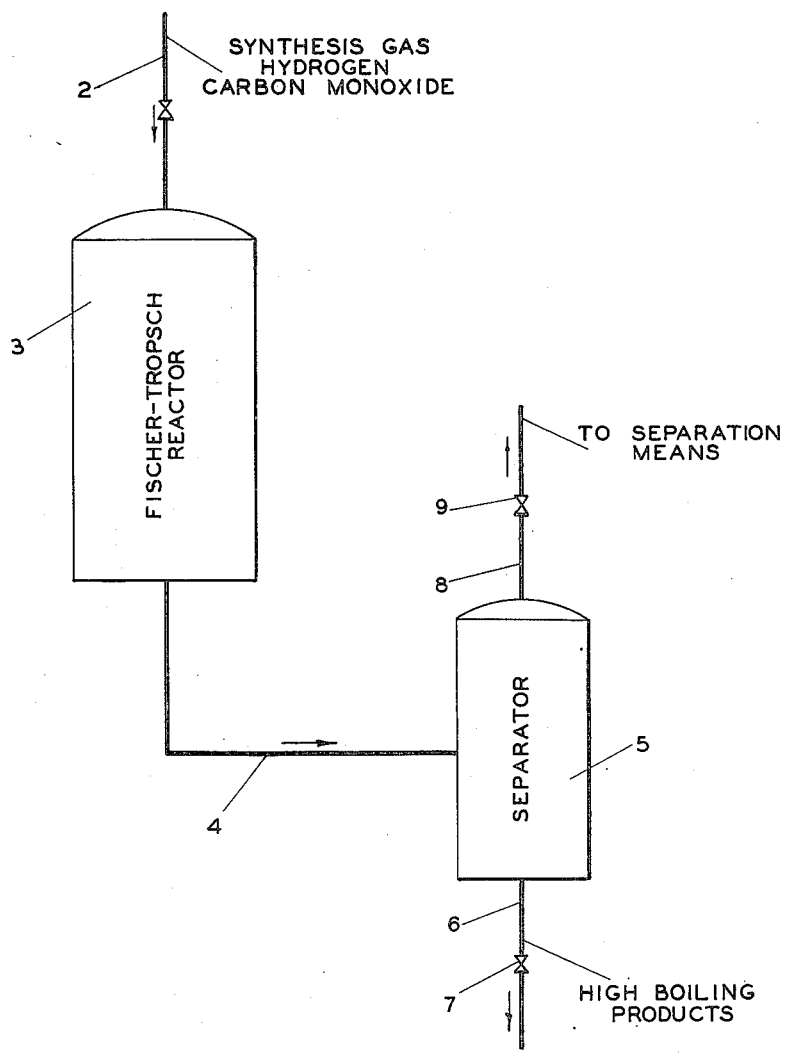

2,540,109

UNITED STATES PATENT OFFICE 2,540,109

PROCESS FOR REACTIVATING CATALYSTS

Alvin H. Friedman, Bartlesville, Okla., assignor to Phillips Petroleum Company, a corporation of Delaware Application May 15, 1946, Serial No. 669,793

5 Claims. (Cl. 260—449.6)

This invention relates to the synthesis of hydrocarbons by the catalytic reaction of carbon monoxide and hydrogen. It relates further to an improved method for reactivating catalyst which has become spent in such a process.

In processes of the Fischer-Tropsch type, in which carbon monoxide and hydrogen are reacted in the presence of a catalyst to form hydrocarbons, the product contains hydrocarbons ranging in molecular complexity from methane to wax. During the course of the reaction, wax accumulates on the catalyst surface until it impairs the activity of the catalyst to such an extent that wax removal is necessary. In accordance with practice known to the art, when sufficient wax has accumulated on the catalyst to impair the activity, the catalyst is treated, under reaction conditions, with hydrogen or with an inert gas to remove the wax. Alternatively, the wax may be removed by treatment with a suitable solvent. Such treatments necessitate interruption of the carbon monoxide-hydrogen conversion process and introduction of the proper gas or solvent into the system. Furthermore, after catalyst reactivation, when carbon monoxide-hydrogen conversion has been resumed, the product obtained during the initial part of the conversion cycle contains an undesirably high proportion of relatively undesirable products, chiefly methane and carbon dioxide, and correspondingly low proportions of desired liquid hydrocarbons. After a time, however, the methane content decreases, and the proportion of higher-boiling, more desirable hydrocarbons correspondingly increases. The initial part of the cycle is often called the "breaking-in" period.

The present invention provides a convenient process for removing wax from Fischer-Tropsch catalysts, in which interruption of the carbon monoxide-hydrogen reaction is minimized. In addition, the dewaxed catalyst requires substantially no breaking-in period after resumption of the carbon monoxide-hydrogen reaction process, and the active life of the reactivated catalyst is longer than that of catalysts reactivated by processes hitherto known to the art.

An object of the present invention is to provide an improved process for the synthesis of hydrocarbons from carbon monoxide and hydrogen. A further object of the present invention is to provide an improved process for the reactivation of catalyst which has become spent by the deposition of wax thereon during a hydrocarbon synthesis reaction of the Fischer-Tropsch type. Another object of the present invention is to permit such reactivation without necessitating any change in the composition or temperature of the synthesis gas. It is a still further object of the present invention to reactivate the catalyst in such a manner that substantially no breaking-in period is required after resumption of flow of synthesis gas. Other objects will be readily apparent from the herein disclosure.

In accordance with this invention, wax is removed from a Fischer-Tropsch catalyst by contacting the catalyst with a mixture of carbon monoxide and hydrogen, preferably in the same molar ratio used in the Fischer-Tropsch feed gas and under such conditions that the carbon monoxide is substantially completely consumed in the first portion of the catalyst bed. Temperature and pressure during the wax removal are preferably substantially the same as the temperature and the pressure during the carbon monoxide-hydrogen reaction. It has been discovered, however, that wax may be effectively removed by operating at zero space velocity or one which is substantially lower than that utilized in the hydrocarbon synthesis and which will not produce any substantial yield of higher boiling hydrocarbon. The preferred space velocity is zero, but may be as high as 10 gaseous volumes per volume of catalyst per hour. The time required for wax removal is ordinarily 3 to 12 hours, but longer periods may be used.

The hydrocarbon synthesis reaction for the production of gasoline range and higher boiling hydrocarbons may be carried out in the manner known to the art. In general, using cobalt catalysts or those containing substantial portions thereof, reaction temperatures in the range of 175–225 C. may be used with the optimum temperature being in the neighborhood of 185–190 C. Ordinary iron catalysts operate best in a narrow range close to 240 C. while sintered iron catalysts require temperatures in the neighborhood of 320 C.

The synthesis reaction is usually carried out at atmospheric or medium pressures, depending on the composition of product desired and the catalyst used. A preferred range of pressures suitable for general use is from 5 to 15 atmospheres, but solid and liquid hydrocarbons may be produced in good yields at pressures of atmospheric to 150 atmospheres or higher.

Flow rates are variable, depending also on catalyst, cooling means used and products desired. Increasing contact time results in a lower catalyst operating temperature and higher yields per pass with less formation of methane. In order to obtain a satisfactory rate of production suitably rapid flow rates must be provided. With cobalt catalysts, for example, space velocities of about 95–115 cubic feet of synthesis gas per hour per cubic foot of catalyst are usually preferred. A space velocity of 113 cubic feet gives a conversion of about 70 per cent per pass at 185 C. With sintered iron catalysts, much higher space velocities may be used, and velocities of 10,000–30,000 cubic feet of synthesis gas per hour per cubic foot of catalyst have given satisfactory results.

Since the reaction is highly exothermic, cooling means must ordinarily be provided. Such means include cooling tubes through which water or other cooling fluid is circulated, such tubes being positioned in or surrounding the catalyst zone. The use of direct heat exchange with non-reactive liquids directly introduced into the reaction zone has also been suggested.

The synthesis gas is usually composed of 2 parts of hydrogen to 1 of carbon monoxide. For iron catalysts which produce large amounts of $CO_2$, however, the optimum ratio is 3 parts of hydrogen to 2 parts of carbon monoxide. However, the composition of the synthesis gas may vary from 1 to 3 parts of hydrogen for each part of CO.

In addition to the iron and cobalt catalysts referred to herein, other desirable catalysts include nickel-manganese-alumina on kieselguhr, nickel-thoria on kieselguhr, and cobalt-thoria-copper on kieselguhr.

One embodiment of the invention is here described with reference to the accompanying drawing, which is a schematic flow-diagram of one arrangement of apparatus suitable for practicing the invention. Feed gas comprising carbon monoxide and hydrogen, preferably in a molar ratio of about 1:2, enters reactor 3 through inlet 2. Reactor 3 contains a Fischer-Tropsch catalyst. Specific reaction conditions in reactor 3 will depend upon the specific catalyst used. When the catalyst consists of 100 parts by weight of cobalt, 18 parts of thoria, and 100 parts of siliceous material such as Celite or kieselguhr, preferred reaction conditions are: temperature, about 200° C.; pressure, about 100 p. s. i.; and space velocity, about 100 gaseous volumes, measured at standard conditions, per volume of catalyst per hour. It is usually desirable to maintain carbon monoxide conversion at about 70 per cent.

The effluent from reactor 3 is passed through conduit 4 to separator 5 in which high-boiling products, chiefly wax, separate and from which the high-boiling products are withdrawn through outlet 6, provided with valve 7. The unliquefied fraction of the effluent is passed through conduit 8, provided with valve 9, to separation means not shown in the drawing. The separation means usually comprises conventional fractionation and/or absorption systems.

When sufficient wax has accumulated on the catalyst to render the activity undesirably low, valves 7 and 9 are closed. The space velocity through reactor 3 consequently decreases to zero. The temperature and the pressure remains substantially unchanged; the pressure may be maintained constant by means of suitable pressure regulation apparatus not shown in the drawing. The wax that has accumulated on the catalyst drains into separator 5 and may be withdrawn as desired by manipulation of valve 7.

When wax removal is substantially complete, valve 9 is reopened, the space velocity through reactor 3 is readjusted to about 100, and the carbon monoxide-hydrogen reaction process is resumed.

*Example I*

A feed gas comprising carbon monoxide and hydrogen in a molar ratio of 1:2 was converted to liquid hydrocarbons in a Fischer-Tropsch system by contacting with a catalyst consisting of cobalt, thoria, and Celite in a weight ratio of 100:18:100. Reaction conditions were: temperature, 206 C.; pressure, 100 p. s. i.; and space velocity, 100 gaseous volumes (at S. T. P.) of feed per volume of catalyst per hour. Carbon monoxide conversion was maintained at 67 per cent until wax accumulation on the catalyst made further operation unfeasible. The space velocity was then decreased to zero, and the feed gas was allowed to remain in contact with the catalyst at 206 C. and 100 p. s. i. for 17 hours. The space velocity was then increased to 100. The carbon monoxide conversion was found to be 78 per cent, and the initial effluent did not contain undesirably high proportions of methane and carbon dioxide.

*Example II*

In the system described in Example I, carbon monoxide and hydrogen were reacted at 187 C., 100 p. s. i., and a space velocity of 100 gaseous volumes per volume of catalyst per hour to obtain liquid hydrocarbons. When the carbon monoxide conversion had fallen to 52 per cent on account of wax accumulation on the catalyst, the catalyst was contacted with hydrogen at 187 C., 100 p. s. i., and a space velocity of 100 volumes per volume of catalyst per hour for 16 hours.

When the carbon monoxide-hydrogen reaction was resumed, at 190 C., the carbon monoxide conversion was over 80 per cent and the initial effluent contained a high proportion of methane. After the reaction had continued for 8 hours, the carbon monoxide conversion had decreased to 52 per cent. The space velocity was then decreased to zero, and the carbon monoxide-hydrogen feed was allowed to stand in contact with the catalyst for 4 hours at 190 C. and 100 p. s. i.

The carbon monoxide-hydrogen reaction process was resumed by increasing the space velocity to 100. The carbon monoxide conversion was 62 per cent and remained substantially constant at this value for over 24 hours. In contrast to the reaction cycle following the reactivation of the catalyst with hydrogen, no high initial yield of methane was obtained. This indicates clearly that the catalyst reactivated in this way does not require a breaking-in period.

The reactivated catalyst was used continuously, in alternate synthesis and regeneration periods in accordance with this invention, for over 1000 hours, at the end of which time it was still readily restored to activity substantially equal to that obtained by the first reactivation with carbon monoxide and hydrogen.

Satisfactory removal of wax and renewed activity of catalyst are also obtained by the use of space velocities of carbon monoxide-hydrogen synthesis gas mixtures ranging from 0 to 10, and at temperatures of 175–320 C. and pressures of atmospheric to 150 atmospheres or higher. Generally, temperature and pressure conditions corresponding to those used in the reaction are desired, since in this way the simplest type of reaction-reactivation cycle may be achieved.

I claim:

1. In a process for the synthesis of hydrocarbons from a synthesis gas mixture containing carbon monoxide and hydrogen in the presence of a catalyst for the reaction wherein said catalyst is deactivated by deposition of wax thereon, the method of reactivating said catalyst which comprises contacting said catalyst with said synthesis gas mixture at a space velocity substantially below that at which the synthesis reaction was carried out and below that at which any substantial yield of hydrocarbons is effected, at a temperature and for a period of time such that substantially complete removal of the wax is effected.

2. A process for the synthesis of hydrocarbons from a synthesis gas mixture comprising carbon monoxide and hydrogen which comprises contacting said synthesis gas with a catalyst for the reaction under reaction conditions of temperature, pressure, and space velocity until said catalyst is substantially deactivated by the deposition of wax thereon, decreasing the space velocity of the synthesis gas below that required for the hydrocarbon synthesis reaction while maintaining substantially reaction conditions of temperature and pressure until the wax is substantially removed, and then increasing the flow rate to the desired space velocity for the reaction.

3. A process according to claim 2 wherein the space velocity during reactivation is from 0 to 10 gaseous volumes of synthesis gas per volume of catalyst per hour.

4. In a process for the synthesis of hydrocarbons from a synthesis gas mixture containing carbon monoxide and hydrogen in the presence of an iron catalyst wherein said catalyst is deactivated by deposition of wax thereon, the method of reactivating said catalyst which comprises contacting said catalyst with said synthesis gas mixture at a space velocity lower than the space velocity utilized during said reaction and below the space velocity at which a conversion of synthesis gas to hydrocarbons is effected and at a temperature and for a period of time such that removal of the wax is effected.

5. A process for the synthesis of hydrocarbons from a synthesis gas mixture comprising carbon monoxide and hydrogen which comprises contacting said synthesis gas with an iron catalyst under reaction conditions of temperature, pressure, and space velocity until said catalyst is deactivated by the deposition of wax thereon, decreasing the space velocity of the synthesis gas below that required for the hydrocarbon synthesis reaction and within the range of 0 to 10 gaseous volumes of synthesis gas per volume of catalyst per hour while maintaining reaction conditions of temperature and pressure until the wax is removed, and then increasing the flow rate of synthesis gas to the desired space velocity for the reaction.

ALVIN H. FRIEDMAN.

REFERENCES CITED

The following references are of record in the file of this patent:

UNITED STATES PATENTS

| Number | Name | Date |
|---|---|---|
| 2,244,196 | Herbert | June 3, 1941. |
| 2,251,554 | Sabel et al. | Aug. 5, 1941 |

OTHER REFERENCES

Meller, "Australian Chem. Inst. Journal & Proc.," vol. 10, No. 5, pages 125–9, April-May 1943.